(12) United States Patent
Reo et al.

(10) Patent No.: US 8,474,770 B2
(45) Date of Patent: Jul. 2, 2013

(54) WALL MOUNTING BRACKET

(75) Inventors: Ann Marie Reo, Wilmette, IL (US); Chantal Louise Pittman, Manchaca, TX (US); Brian Scott Jalufka, Leander, TX (US)

(73) Assignee: Cooper Technologies Company, Houston, TX (US)

( * ) Notice: Subject to any disclaimer, the term of this patent is extended or adjusted under 35 U.S.C. 154(b) by 322 days.

(21) Appl. No.: 12/953,152

(22) Filed: Nov. 23, 2010

(65) Prior Publication Data

US 2012/0126077 A1 May 24, 2012

(51) Int. Cl.
*A47B 96/00* (2006.01)

(52) U.S. Cl.
USPC ........... 248/224.7; 248/231.91; 248/251; 403/361

(58) Field of Classification Search
USPC ........ 248/27.1, 205.1, 216.4, 220.21, 220.22, 248/224.7, 229.14, 231.91, 251; 403/361, 403/362
See application file for complete search history.

(56) References Cited

U.S. PATENT DOCUMENTS

| | | | | |
|---|---|---|---|---|
| 1,621,566 A * | 3/1927 | Tierney | ................ | 248/205.1 |
| 2,146,654 A * | 2/1939 | Shea et al. | ................ | 174/164 |
| 2,490,854 A * | 12/1949 | Bozoti | ................ | 248/224.7 |
| 4,142,809 A * | 3/1979 | Shell | ................ | 403/201 |
| 4,540,207 A * | 9/1985 | Klasen et al. | ................ | 292/341.17 |
| 4,998,701 A * | 3/1991 | Rawald | ................ | 248/224.7 |
| 6,113,045 A * | 9/2000 | Kuo | ................ | 248/222.14 |
| 6,599,049 B2 * | 7/2003 | Erben | ................ | 403/27 |
| 8,162,559 B2 * | 4/2012 | Krige | ................ | 403/259 |
| 2002/0104946 A1 * | 8/2002 | Lai | ................ | 248/316.8 |
| 2002/0109056 A1 * | 8/2002 | Weshler et al. | ................ | 248/220.22 |
| 2005/0161568 A1 * | 7/2005 | Hwang | ................ | 248/231.91 |
| 2006/0175496 A1 * | 8/2006 | Lai | ................ | 248/251 |
| 2008/0217271 A1 * | 9/2008 | Walter | ................ | 211/89.01 |
| 2010/0102186 A1 * | 4/2010 | Keyvanloo | ................ | 248/224.7 |
| 2012/0168583 A1 * | 7/2012 | Hsu et al. | ................ | 248/222.14 |

* cited by examiner

*Primary Examiner* — Bradley Duckworth
(74) *Attorney, Agent, or Firm* — King & Spalding LLP

(57) ABSTRACT

A wall mounting bracket assists in mounting equipment to a wall. The wall mounting bracket includes a plate, a post, and a sliding nut. At least a portion of the post extends outwardly from the surface of the plate. The plate is coupled to a stud or other mounting device positioned within the wall behind the sheetrock. The post includes an equipment mounting section and a spacer. The spacer is positioned between the equipment mounting section and the plate and accommodates different wall thicknesses. The bottom surface of the sliding nut is slidably and securely positionable along the top surface of the equipment mounting section. Different types of wall-mounted equipment is coupled to the sliding nut and the equipment mounting section of the wall mounting bracket. Use of the wall mounting bracket allows the equipment to be mounted to the wall without an exposed flange and preserve structural integrity.

20 Claims, 7 Drawing Sheets

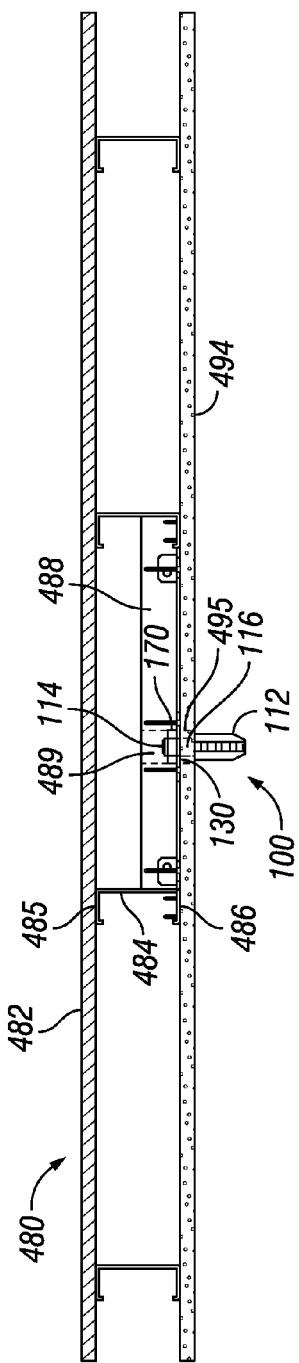
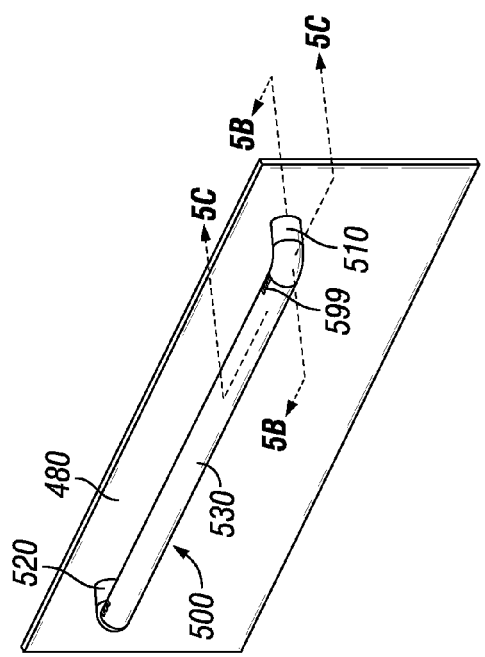
FIG. 4
FIG. 5A

WALL MOUNTING BRACKET

TECHNICAL FIELD

The present invention relates to wall mounting brackets for mounting and structurally supporting various equipment. More specifically, the present invention relates to a wall mounting bracket that includes mounting hardware that is concealed once the equipment is coupled thereto.

BACKGROUND

A wall mounting bracket is a device for mounting and supporting equipment to a wall. Conventional wall mounting brackets include mounting hardware that provides support for coupling the equipment to the wall having an interior and exterior surface, either directly or indirectly. The interior surface of the wall faces an interior area between opposing walls that may include wall support structures and/or internal electrical wiring. The exterior wall surface faces a room or area that is readily accessible by an occupant. The equipment can include, but is not limited to, balance beams, sinks, cantilevered light fixtures, handrails, grab bars, cabinets, closet rods, and hanger rods.

Conventional wall mounting brackets extend through the wall and include a first end and a second end. The first end extends outwardly from the exterior wall surface and is coupled to the equipment. The second end extends in an opposite direction and is positioned within the interior area. The second end is secured to a post typically located adjacent to the interior surface of the wall. The conventional wall mounting brackets also include a flange that is located between the first end and the second end and is positioned adjacently to the exterior surface of the wall. The flange provides additional structural support for mounting the equipment to the wall.

SUMMARY

One exemplary embodiment of the invention can include a wall mounting bracket for mounting a piece of equipment to a wall. The wall mounting bracket can include a plate, a post, and a sliding nut. At least a portion of the post can extend horizontally out from the surface of the plate. The post can include an equipment mounting section and a spacer. The equipment mounting section can include a first end, a second end, and a top surface disposed between the first end and the second end. The spacer can be positioned between and adjacent to each of the plate and the first end of the equipment mounting section. The sliding nut can include a bottom surface that is positionable adjacent the top surface of the equipment mounting section.

Another exemplary embodiment of the invention can include a wall mounting system. The wall mounting system can include a wall mounting bracket and a piece of equipment. The wall mounting bracket can include a plate, a post, and a sliding nut. At least a portion of the post can extend orthogonally out from the surface of the plate. The post can include an equipment mounting section and a spacer. The equipment mounting section can include a first end, a second end, and a top surface disposed between the first end and the second end. The spacer can be positioned between and adjacent to the plate and the first end of the equipment mounting section. The sliding nut can include a bottom surface that is adjustably positioned along the top surface of the equipment mounting section. The equipment can include a wall mounting section that is configured to receive the equipment mounting section and the sliding nut. Upon coupling the wall mounting section to the equipment mounting section and the sliding nut, the wall mounting section can substantially surround the post.

Another exemplary embodiment of the invention can include a method of installing a piece of equipment to a wall. The method can include selecting a piece of equipment and a wall to mount the equipment. The equipment can include a wall mounting section. The method also can include installing a first portion of a wall mounting bracket into the wall so that a second portion of the wall mounting bracket extends outwardly from the wall. The method further can include coupling at least a portion of the wall mounting section to the second portion of the wall mounting bracket. The mounting bracket can be concealed by at least one of the equipment and the wall once the equipment is coupled to the second portion of the wall mounting bracket.

BRIEF DESCRIPTION OF THE DRAWINGS

The foregoing and other features and aspects of the invention may be best understood with reference to the following description of certain exemplary embodiments, when read in conjunction with the accompanying drawings, wherein:

FIG. 4 is a top view of the wall mounting bracket installed within a wall in accordance with an exemplary embodiment of the present invention;

FIG. 5A is a perspective view of a balance beam mounted to a wall in accordance with an exemplary embodiment of the present invention;

The drawings illustrate only exemplary embodiments of the invention and are therefore not to be considered limiting of its scope, as the invention may admit to other equally effective embodiments.

BRIEF DESCRIPTION OF EXEMPLARY EMBODIMENTS

Figure 1A:
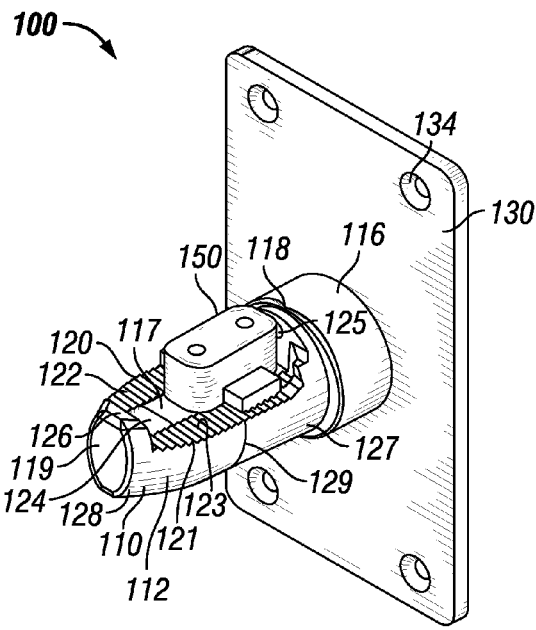
FIG. 1A is a perspective view of a wall mounting bracket in accordance with an exemplary embodiment of the present invention.
Figures 1B, 1C:
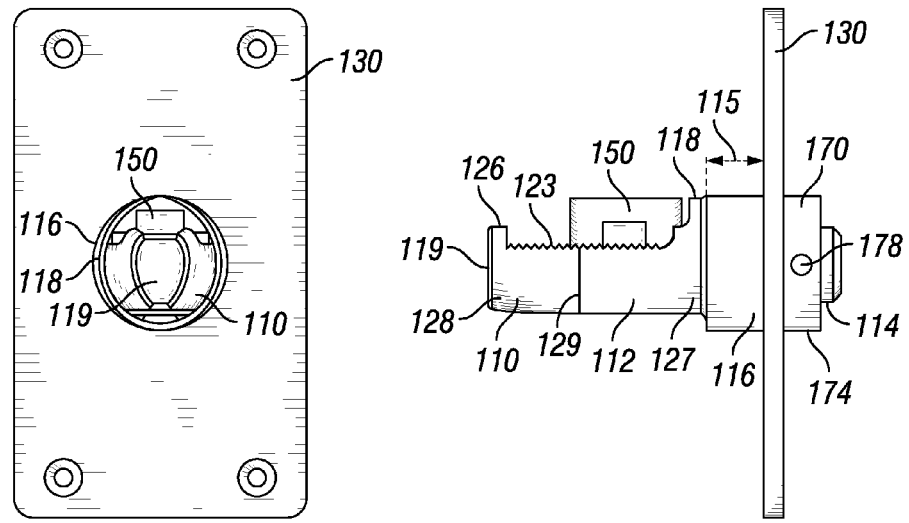
FIG. 1B is a front elevation view of the wall mounting bracket of FIG. 1A in accordance with an exemplary embodiment of the present invention.
FIG. 1C is a side elevation view of the wall mounting bracket of FIG. 1A in accordance with an exemplary embodiment of the present invention.
Figure 2:
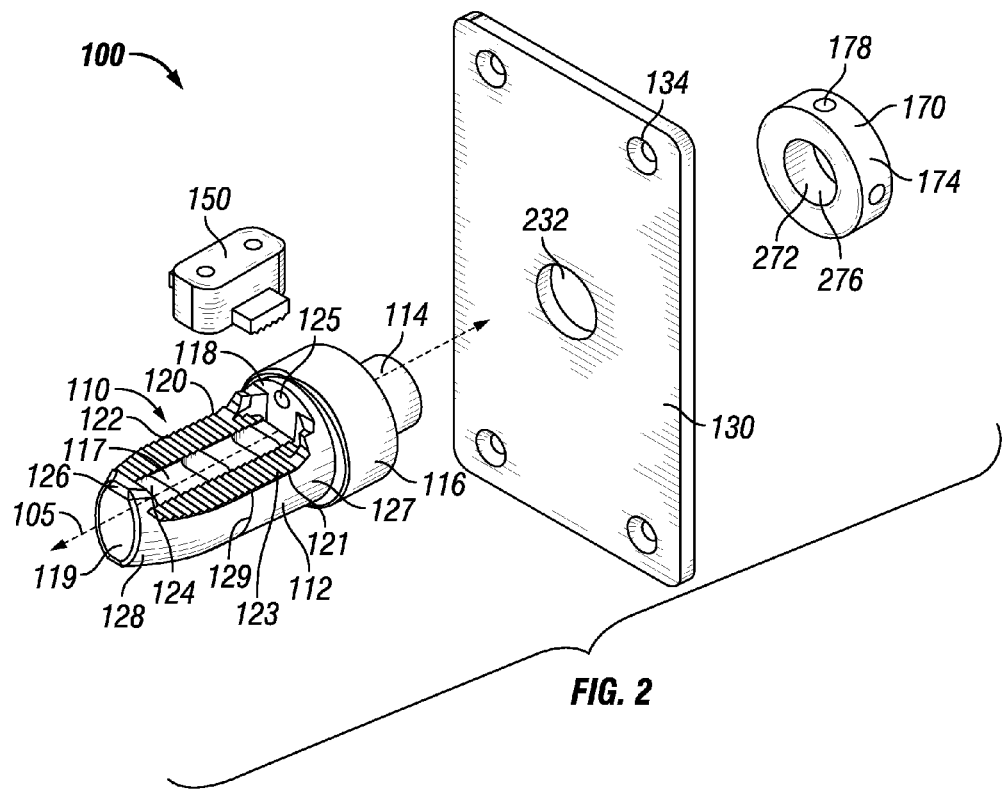
FIG. 2 is an exploded view of the wall mounting bracket of FIGS. 1A-C in accordance with an exemplary embodiment of the present invention.

The disclosure is better understood by reading the following description of non-limiting, exemplary embodiments with reference to the attached drawings, wherein like parts of each of the figures are identified by like reference characters throughout, and which are briefly described below. FIGS. 1A-C are various views of a wall mounting bracket 100 in accordance with an exemplary embodiment of the present invention. FIG. 2 is an exploded view of the wall mounting bracket 100. Referring to FIGS. 1A-C and 2, the wall mounting bracket 100 includes a post 110, a plate 130, a sliding nut 150, and a nut 170. The post 110, the plate 130, the sliding nut 150, and the nut 170 provide structural support for mounting equipment to a wall. Such equipment could include, but is not limited to, balance beams, sinks, cantilevered light fixtures, handrails, grab bars, cabinets, closet rods, and hanger rods.

The post 110 includes an equipment mounting section 112, a nut mounting section 114, and a spacer 116 positioned therebetween. In one exemplary embodiment, the post 110 is fabricated as a single component. Alternatively, the post 110 can be fabricated using multiple components that are coupled together. The exemplary post 110 is fabricated using an aluminum casting alloy, however, other suitable materials known to people having ordinary skill in the art and having the benefit of the present disclosure can be used without departing from the scope and spirit of the exemplary embodiment.

The exemplary equipment mounting section 112 is substantially semi-cylindrically shaped with a smooth outer surface and a substantially planar top surface 117, a first end 118 positioned at one end of the equipment mounting section 112, and a second end 119 positioned at the opposing end of the equipment mounting section 112. In one exemplary embodiment, each of the first and second ends 118, 119 are substantially orthogonal to the top surface 117. The top surface 117 also includes a first longitudinal edge 120 extending from the first end 118 to the second end 119 and a second longitudinal edge 121 also extending from the first end 118 to the second end 119. The second longitudinal edge 121 is positioned opposite of and substantially parallel to the first longitudinal edge 120. The top surface 117 also includes one or more ridges 122, 123 positioned adjacent each of the first longitudinal edge 120 and the second longitudinal edge 121, respectively. These ridges 122, 123 extend horizontally toward one another and orthogonal to the longitudinal axis 105 of the top surface 117. The ridges 122, 123 provides positional adjustments for positioning the sliding nut 150 on the top surface 117. The ridges 122, 123 also increase the pull-out strength of the equipment from the wall mounting bracket 100 once properly coupled due to the friction that is created between the ridges 122, 123 and the mating ridges 354 (FIG. 3), which is described below. The top surface 117 also includes one or more channels 124 that are positioned between the ridges 122, 123 and extend vertically through the equipment mounting section 112. In one exemplary embodiment, three channels 124 are provided, however, the number of channels is adjustable based on the actual design factors and the intended use. These channels 124 are sized and shaped to receive a screw, rivet, or other known attachment device. According to some exemplary embodiments, the channels 124 are about 0.18 inches in diameter; however, the sizes are also alterable in alternative embodiments based on the design factors and the intended use. Although the channels 124 are longitudinally spaced apart along the exemplary top surface 117 of FIGS. 1A-C, in alternative embodiments, one or more channels could be latitudinally spaced apart along the top surface 117.

The exemplary first end 118 is positioned adjacent the spacer 116 and is substantially circular in shape. In alternative embodiments, the first end 118 is capable of being any other geometric or non-geometric shape. The first end 118 extends elevationally above the top surface 117 and optionally includes an aperture 125 that extends through at least the first end 118 and the spacer 116. In one exemplary embodiment, the aperture 125 is elevationally positioned above the top surface 117 and allows for one or more electrical wires (not shown) to be routed from the interior area of the wall into the equipment that is coupled to the wall mounting bracket 100. For example, if the equipment is a balance beam that includes lights, the electrical wiring passes from the internal space between the walls to the equipment via the aperture 125. Once the equipment is coupled to the wall mounting bracket 100, the electrical wiring is concealed. In certain alternative embodiments, the aperture 125 also extends through the nut mounting section 114.

The second end 119 is positioned at an opposing end from the first end 118 and, in one exemplary embodiment, has a substantially elliptical shape and more specifically a frustum of an ellipse. Alternatively, the second end 119 is capable of being any other geometric or non-geometric shape. The second end 119 extends up from the top surface 117 and forms a lip 126 with the top surface 117. The lip 126 prevents the sliding nut 150 from falling off the wall mounting bracket 100 during installation and prevents the installer from installing the sliding nut 150 too far from the first end 118. In one exemplary embodiment, the second end 119 is shorter vertically and has a smaller surface area that the first end 118.

The equipment mounting section 112 also includes a first section 127, a second section 128, and a transitional area 129 that transitions between the first section 127 and the second section 128. The first section 127 is positioned adjacent to the spacer 116 and extends outwardly therefrom. In one exemplary embodiment, the first section 127 is semi-cylindrically shaped and has a uniform perimeter extending outwardly from the spacer 116. The exemplary second section 128 is semi-conically shaped and has a reducing perimeter along the semi-conically shaped portion as the second section 128 extends further outwardly from the transitional area 129. In alternative embodiments, the first section 127 and the second section 128 are capable of having a different shapes and/or varying perimeters.

The exemplary spacer 116 is positioned adjacent the first end 118 of the equipment mounting section 112 and has a substantially cylindrical shape. The spacer 116 extends horizontally a length 115. In one exemplary embodiment, the length 115 is substantially the same as the thickness of the sheetrock for the wall. Sheetrock is typically available in various thicknesses, including, but not limited to, ⅝ inch, 1¼ inch, and 1½ inch. Thus, when ⅝ inch sheetrock is used, the length 115 of the spacer 116 is about ⅝ inch according to some exemplary embodiments. In certain exemplary embodiments, additional spacers (not shown) are coupled to the spacer 116, thereby increasing the horizontal length 115 of the collective spacers 116. According to certain exemplary embodiments, the spacer 116 is sized to accommodate sheetrock thicknesses ranging from about ½ inch to about 1⅝ inch without adding additional spacers. This is made possible because of the several channels 124 formed within the top surface 117. For example, when the thickness of the sheetrock is greater than the length 115 of the spacer 116, the channel 124 adjacent to the spacer 116 is not used for coupling the sliding nut 150 to the top surface 117; instead, the remaining two channels 124 are used to couple the sliding nut 150 to the top surface 117.

The exemplary nut mounting section 114 is at least partially threaded and extends horizontally outward from the spacer 116 in a direction opposite that of the equipment mounting section 112. The nut mounting section 114 has a substantially cylindrical shape and is sized to be inserted through a passageway 232 formed through the plate 130. The diameter of the nut mounting section 114 is generally less than the diameter of the spacer 116 and the diameter of the passageway 232 so that the nut mounting section is insertable through the passageway 232.

The exemplary plate 130 has a substantially rectangular shape and includes a passageway 232 and four openings 134 extending therethrough. Alternatively, the plate 130 is capable of being any geometric or non-geometric shape. The exemplary plate 130 is fabricated using carbon steel, however, other suitable materials can be used without departing from the scope and spirit of the exemplary embodiment.

In one exemplary embodiment, the passageway 232 is positioned substantially in the center of the plate 130 but is capable of being positioned at various alternative locations on the plate 130. The passageway 232 is sized and shaped to receive the nut mounting section 114 through the passageway 232. The exemplary passageway 232 is also sized to prevent the spacer 116 from passing therethrough due to the spacer's 116 larger diameter. In one exemplary embodiment, the nut mounting section 114 friction fits with the passageway 232.

Each opening 134 is positioned substantially adjacent to a corresponding corner of the plate 130. Alternatively, the positioning and number of openings 134 is adjustable. For example, when a circular plate (not shown) is used, the openings 134 can be positioned radially around the circumferential edge of the plate. The openings 134 are shaped and sized to accommodate screws, rivets, or other known attachment devices for coupling the plate 130 to a blocking 488 (FIG. 4) and/or blocking connection 484 (FIG. 4) that is located within the internal wall space.

The nut 170 is cylindrically shaped and includes a channel 272 formed therethrough. The nut 170 also includes an outer sidewall 174 and an inner sidewall 276. The channel 272 is sized and shaped to be coupled to at least a portion of the nut mounting section 114 once the nut mounting section 114 is inserted through the passageway 232. Thus, in one exemplary embodiment, the diameter of the channel 272 is slightly larger than the diameter of the nut mounting section 114. According to certain exemplary embodiments, the nut 170 also includes one or more apertures 178 each defining a channel that extends from the outer sidewall 174 to the inner sidewall 276. These apertures 178 are capable of receiving set-screws or other known attachment devices for coupling the nut 170 to the nut mounting section 114 or for maintaining the position of the nut 170 to the nut mounting section after being coupled together. In one exemplary embodiment, the nut 170 includes threads (not shown) on the inner sidewall 276 that rotatably coupled to the corresponding threads on one exemplary embodiment of the nut mounting section 114. In addition, the diameter of the outer sidewall 174 is typically larger than the diameter of the passageway 232 to prevent the nut 170 from passing through the passageway 232.

Figure 3A:
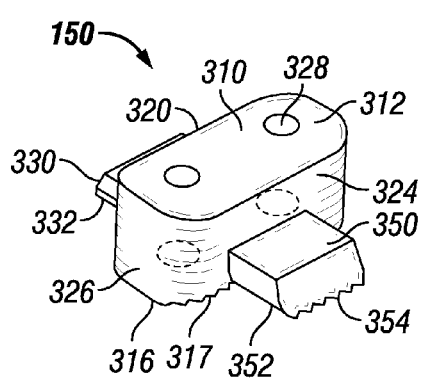
FIG. 3A is a perspective view of a sliding nut in accordance with an exemplary embodiment of the present invention.
Figure 3B:
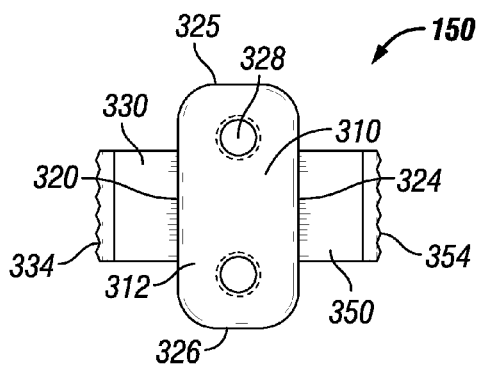
FIG. 3B is a top view of the sliding nut of FIG. 3A in accordance with an exemplary embodiment of the present invention.

FIG. 3A-B are perspective and top views of the sliding nut 150 in accordance with an exemplary embodiment of the present invention. Referring to FIGS. 1A-3B, the sliding nut 150 includes a body 310, a first protrusion 330, and a second protrusion 350. The exemplary body 310 of FIG. 3A has a substantially rectangular shape. In alternative embodiments, the body 310 can be any geometric or non-geometric shape. The body 310 includes a top surface 312, a bottom surface 316, a first longitudinal sidewall 320, a second longitudinal sidewall 324, a first latitudinal sidewall 325 and a second latitudinal sidewall 326. The first longitudinal sidewall 320 and the second longitudinal sidewall 324 are opposite one another and substantially parallel. The first longitudinal sidewall 320 and the second longitudinal sidewall 324 extend from respective longitudinal edges of the top surface 312 to respective longitudinal edges of the bottom surface 316.

In one exemplary embodiment, the body 310 also includes two openings 328 that extend through the body 310 from the bottom surface 316 to the top surface 312. Alternatively, the openings 328 extend from the bottom surface 316 towards the top surface 312, but do not extend completely through the top surface 312. Although two openings 328 are illustrated in the example of FIG. 3A, the number of openings 328 can be more or less than two. The openings 328 receive screws or other attachment devices for coupling the wall mounting bracket 100 to the equipment. The bottom surface 316 optionally includes mating ridges 317 adjacent to where the first longitudinal sidewall 320 and the second longitudinal sidewall 324 meet with the bottom surface 316. Mating ridges 317 cooperatively engage ridges 122, 123 when the sliding nut 150 is positioned on the top surface 117 and prevent the sliding nut 150 from sliding along the top surface 117.

The first protrusion 330 extends horizontally outward from the first longitudinal sidewall 320 and includes a bottom surface 332. The exemplary bottom surface 332 is substantially planar to the bottom surface 316. In one exemplary embodiment, the bottom surface 332 includes mating ridges 334 that are the same as or substantially similar to mating ridges 317. In operation, the mating ridges 334 cooperatively engage one of ridges 122, 123 when the sliding nut 150 is positioned on top of the top surface 117. In certain exemplary embodiments, the mating ridges 334 cooperatively engage ridges 122, 123 when the sliding nut 150 is positioned on the top surface 117 and prevent the sliding nut 150 from sliding along the top surface 117.

The second protrusion 350 extends horizontally outward from the second longitudinal sidewall 324 in a direction opposite that of the first protrusion 330. The exemplary second protrusion 350 includes a bottom surface 352 that is substantially planar to the body's bottom surface 316. The bottom surface 352 includes mating ridges 354, that are the same as or substantially similar to mating ridges 317. Mating ridges 354 cooperatively engage one of ridges 122, 123 when the sliding nut 150 is positioned on top of the top surface 117. In certain exemplary embodiments, the mating ridges 354 cooperatively engage ridges 122, 123 when the sliding nut 150 is positioned on the top surface 117 and prevent the sliding nut 150 from sliding along the top surface 117 in the longitudinal direction. In certain exemplary embodiments, the first protrusion 330 and the second protrusion 350 are shaped the same; however, the shapes can be different in other exemplary embodiments.

Referring back to FIGS. 1A, 1C, and 2, the nut mounting section 114 is inserted through the plate's passageway 232. The nut 170 is securely coupled around the nut mounting section 114 so that the post 110 cannot be removed away from the plate 130. For example, the nut 170 is coupled to the nut mounting section 114 according to the method previously described above or via alternative methods that are known to people having ordinary skill in the art having the benefit of the present disclosure. The sliding nut 150 is positioned on the top surface 117 of the post 112 so that at least the mating ridges 334, 354 mate with ridges 122, 123, respectively. The openings 328 of the sliding nut 150 are aligned with one or more of the channels 124. In certain exemplary embodiments, the sliding nut 150 is positioned on the top surface 117 after the wall mounting bracket 100 is securely installed within the wall.

FIG. 4 is a top view of the wall mounting bracket 100 installed within a wall 480 in accordance with an exemplary embodiment of the present invention. The components of the wall mounting bracket 100 have been previously described and its installation into the wall 480 is described in further detail below. Referring to FIG. 4, the wall 480 includes a structure 482, one or more blocking connections 484, blocking 488, and sheetrock 494. The structure 482 is fabricated from a suitable material, such as bricks, wood, metal, sheetrock, or other materials known to people having ordinary skill in the art having the benefit of the present disclosure. The structure 482 is illustrated as being continuous, but is non-continuous in other exemplary embodiments. In some exemplary embodiments, the structure 482 is sheetrock of an adjacent room. In yet other exemplary embodiments, the structure 482 is wood, brick, or some other known material which forms an outer surface of a building (not shown). In certain alternative embodiments, the structure is optional.

The exemplary blocking connections 484 are substantially C-shaped but are capable of being fabricated in other shapes. The blocking connections 484 are fabricated from materials, such as wood, metal, polymers or other materials. In one exemplary embodiment, the blocking connections 484 are wall studs. Each blocking connection 484 includes a first end 485, a second end 486 opposite the first end 485, and an intermediate portion 487 that extends between the first and second ends 485, 486. The first end 485 is substantially parallel to the second end 486 and is coupled to the structure 482 using nails, screws, rivets, or other known attachment devices. The blocking connections 484 are typically positioned along the structure 482 in a horizontally equidistant manner; however, the spacing between each consecutive blocking connection 484 can vary.

Figure 5B:
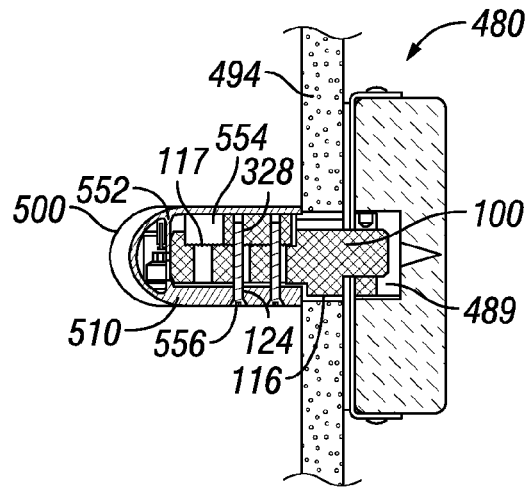
FIG. 5B is a cross-sectional view of the balance beam of FIG. 5A mounted to the wall in accordance with an exemplary embodiment of the present invention.
Figure 5C:
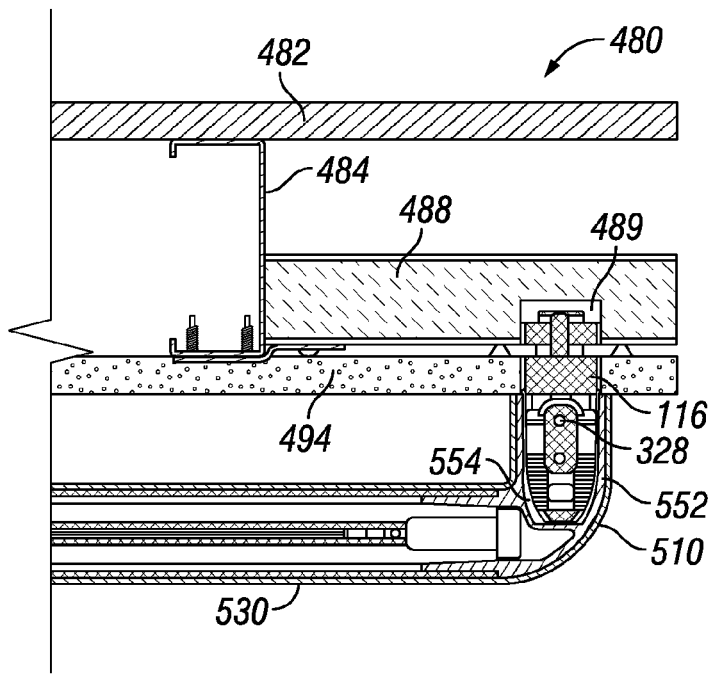
FIG. 5C is a another cross-sectional view of the balance beam of FIG. 5A mounted to the wall in accordance with an exemplary embodiment of the present invention.

Blocking 488 has a substantially rectangular shape and is typically coupled to two adjacent blocking connections 484 using screws or bolts and extends therebetween. A portion of the blocking 488 where the wall mounting bracket 100 is inserted into the blocking is removed, thereby forming an opening 489, which is also illustrated in FIGS. 5B-5C, within the blocking 488, to accommodate positioning of the nut 170 and at least a portion of the nut mounting section 114. In one exemplary embodiment, the opening 489 extends entirely through the blocking 488. In alternative embodiments, the opening 489 only extends through a portion of the blocking 488. The opening 489 is typically formed either after the blocking is coupled to the blocking connections 484 or prior to the blocking 488 being coupled to the blocking connections 484. Sheetrock 494 is coupled to the second end 486 of the blocking connections 484 using nails, screws, or other known attachment devices. A sheetrock opening 495 is formed into the sheetrock 494 to accommodate the spacer 116 of the post 110.

To install the wall mounting bracket 100 into the wall 480, all components of the wall 480 are assembled except for the installation of the sheetrock 494 and all components of the wall mounting bracket 100 are assembled except for coupling of the sliding nut 150 (FIG. 1A) to the top surface 117 of the post 110. After the opening 489 is formed into the blocking 488, the nut 170 and the nut mounting section 114 are inserted into the opening 489. The plate 130 is securely coupled to the blocking 488 using screws or other known fastening devices that extend through the plate's openings 134 (FIG. 1A). Sheetrock 494 is coupled to the blocking connections 484 using nails, screws, or other known attachment devices. The perimeter of the sheetrock's opening 495 surrounds the post's spacer 116 once the sheetrock 494 is coupled to the blocking connections 484. Thus, once the sheetrock 494 is installed, the equipment mounting section 112 extends outwardly from the wall 480 to facilitate coupling the equipment to the mounting bracket.

Although one example of the wall 480 and its components are described, the wall 480 includes different components in other exemplary embodiments. For example, in an alternative embodiment, the wall mounting bracket 100 is installed into a wall stud or blocking connection 484, thereby making the blocking 488 optional. Also, as previously mentioned, the structure 482 is optional.

FIG. 5A is a perspective view of a balance beam 500 mounted to the wall 480 in accordance with an exemplary embodiment of the present invention. Referring to FIG. 5A, the balance beam 500 includes a first wall mounting section 510, a second wall mounting section 520, and a rail 530 extending from the first wall mounting section 510 to the second wall mounting section 520. Each of the first wall mounting section 510 and the second wall mounting section 520 are securely coupled to a respective wall mounting bracket 100 (FIG. 4). Once the first wall mounting section 510 and the second wall mounting section 520 are coupled to the wall mounting bracket 100 (FIG. 4), the wall mounting bracket 100 (FIG. 4) is completely concealed. In one exemplary embodiment, once the first wall mounting section 510 and the second wall mounting section 520 are coupled to the wall mounting bracket 100 (FIG. 4), all the components of the wall mounting bracket 100 (FIG. 4) that provide support to the balance beam 500 are concealed.

As seen in FIG. 5A, both the first and second wall mounting sections 510, 520 extend horizontally outward from the wall 480 and are not surrounded by a flange. According to conventional installations of balance beams 500 mounted to a wall, flanges surround the both the first wall mounting section 510 and the second wall mounting section 520, thereby providing additional support to the balance beam 500. Since, the balance beam 500 is wall-mounted using the wall mounting bracket 100 (FIG. 4), additional support provided by flanges is unnecessary.

In one exemplary embodiment, balance beams 500 that are wall-mounted using the wall mounting bracket 100 (FIG. 4) are able to withstand an 800 pound point load applied onto the balance beams in any direction. Alternatively, balance beams 500 that are wall-mounted using the wall mounting bracket 100 (FIG. 4) are able to withstand point loads applied in any direction that range from about 500 pounds to about 800 pounds. In another alternative embodiment, balance beams 500 that are wall-mounted using the wall mounting bracket 100 (FIG. 4) are able to withstand point loads applied in any direction that range from about 200 pounds to about 800 pounds. In still another embodiment, balance beams 500 that are wall-mounted using the wall mounting bracket 100 (FIG. 4) are able to withstand point loads applied in any direction that range from about 50 pounds to about 800 pounds.

FIG. 5B is a cross-sectional view of the balance beam 500 mounted to the wall 480 taken along line 5B-5B of FIG. 5A in accordance with an exemplary embodiment of the present invention. FIG. 5C is a cross-sectional view of the balance beam 500 mounted to the wall 480 taken along line 5C-5C of FIG. 5A in accordance with an exemplary embodiment of the present invention. Referring to FIGS. 5A-5C, the balance beam 500 is wall-mounted to the wall 480 using the wall mounting bracket 100. The first and second wall mounting sections 510, 520 each include a housing 552 that forms a passageway 554 therethrough. The passageway 554 is accessible through one end of each of the first and second wall mounting sections 510, 520. Although the exemplary housing 552 is substantially circular in shape, other geometric or non-geometric shapes can be used. Each of the first and second wall mounting sections 510, 520 also includes one or more openings 556 that facilitate coupling the balance beam 500 to the wall mounting bracket 100. In one exemplary embodiment, the openings 556 are disposed on the underside portion of each of the first and second wall mounting sections 510, 520 so that the openings 556 are aligned with both the channels 124 and the openings 328 of the sliding nut 150. Alternatively, the openings 556 are disposed on other portions of each of the first and second wall mounting sections 510, 520.

To couple the balance beam 500 to the wall mounting bracket 100, the wall mounting bracket 100 is installed within the wall 480 as shown and described with respect to FIG. 4. The sliding nut 150 also is positioned atop the top surface 117 so that the channels 124 and the openings 328 are aligned with one another. After the sheetrock 494 has been installed and disposed around the spacer 116 and the sliding nut 150 is positioned atop the top surface 117, the equipment mounting section 112, which is coupled to the wall 480, is inserted into the passageway 554 of either the first or second wall mounting section 510, 520 such that the housing 552 is disposed around the equipment mounting section 112. The openings 556, the channels 124, and the openings 328 are all aligned with one another. A screw 558, or other attachment device, is inserted through each of the opening 556, the channel 124, and the opening 328 to couple the balance beam 500 to the wall mounting bracket 100. In one exemplary embodiment, two sets of openings 556, channels 124, and openings 328 for coupling the balance beam 500 to the wall mounting bracket 100; however, greater or fewer sets may be devised based user preference and the particular design specifications.

As seen in FIGS. 5A-5C, the ends of the first and second wall mounting sections 510, 520 make contact with the sheetrock 494. In exemplary embodiments where a portion of the wall 480 is non-planar to another portion of the wall 480 one of either the first wall mounting section 510 or the second wall mounting section 520 is fabricated longer than the other. Additionally, in certain exemplary embodiments, the spacer 116 is fabricated to be longer in length to accommodate the distances between the non-planar walls and the longer length of one of the first and second wall mounting sections 510, 520. In exemplary embodiments where the balance beam 500 includes one or more lighting elements 599, the lighting elements 599 are powered using one or more electrical wires (not shown) that are routed from the interior of the wall 480, through the wall mounting bracket 100 via the aperture 125 (FIG. 2), and into the balance beam 500. The lighting elements 599 include, but are not limited to, light emitting diodes ("LEDs"), organic LEDs, halogen lamps, fluorescent lamps, compact fluorescent lamps, high intensity discharge lamps, incandescent lamps, or any other known light sources.

Figure 6:
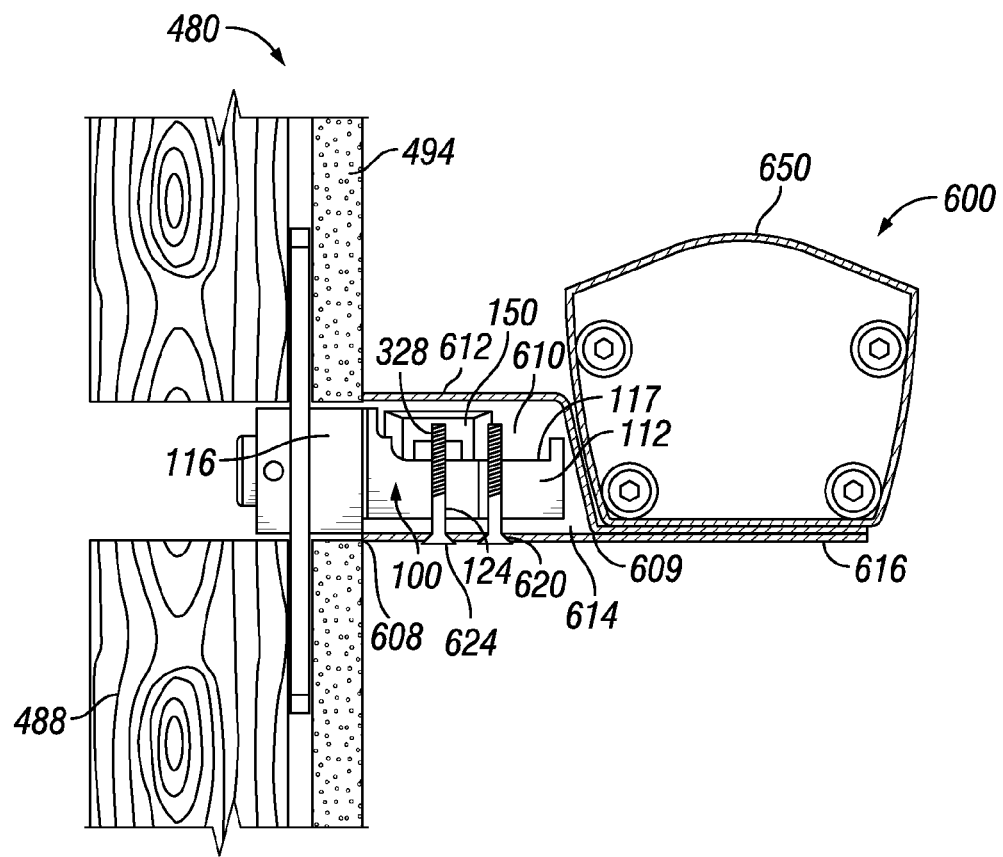
FIG. 6 is a cross-sectional view of a sink assembly mounted to a wall using the wall mounting bracket of FIGS. 1A-C in accordance with an exemplary embodiment of the present invention.
Figure 7A:
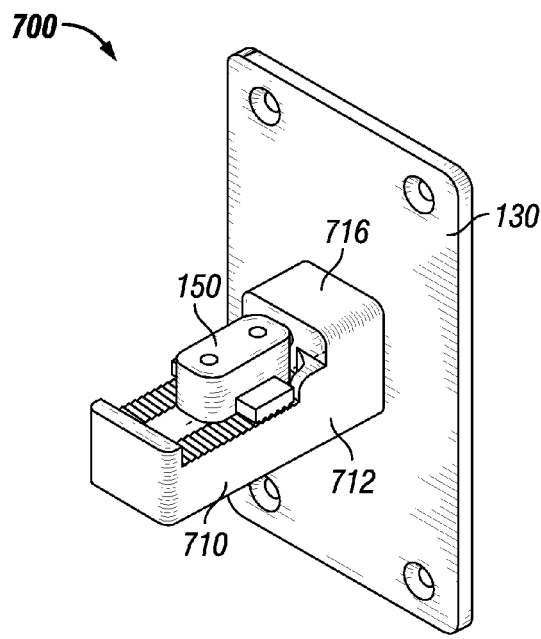
FIG. 7A is a perspective view of a wall mounting bracket in accordance with another exemplary embodiment of the present invention.
Figure 7B:
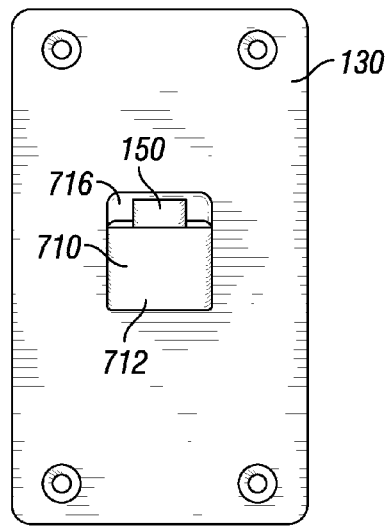
FIG. 7B is a front elevation view of the wall mounting bracket of FIG. 7A in accordance with another exemplary embodiment of the present invention.
Figure 7C:
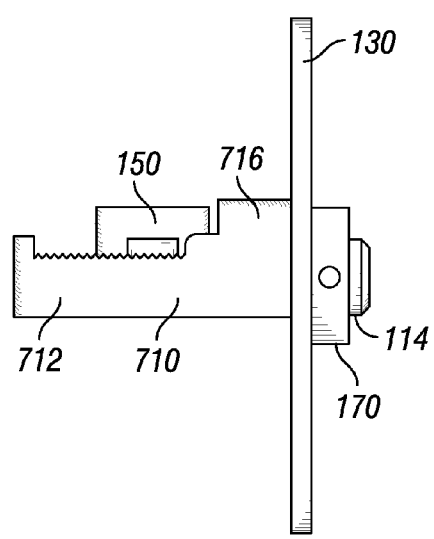
FIG. 7C is a side elevation view of the wall mounting bracket of FIG. 7A in accordance with another exemplary embodiment of the present invention.
Figure 7D:
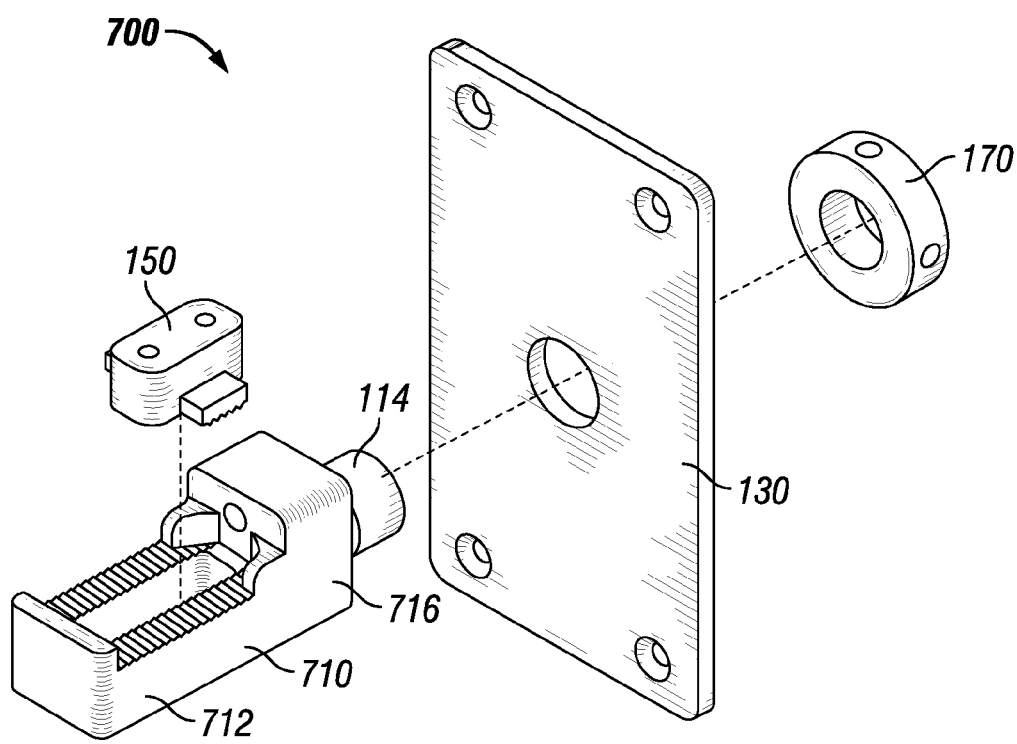
FIG. 7D is an exploded view of the wall mounting bracket of FIG. 7A in accordance with another exemplary embodiment of the present invention.

FIG. 6 is a cross-sectional view of a sink assembly 600 mounted to the wall 480 using the wall mounting bracket 100 in accordance with an exemplary embodiment of the present invention. Referring to FIG. 6, the sink assembly 600 includes a wall mounting section 610 and a sink 650. The wall mounting section 610 includes a housing 612 that forms a passageway 614 therethrough and a sink tray 616 extending outward from the housing 612. The passageway 614 is accessible through a first end 608 of the housing 612. The housing 612 also includes one or more openings 620 that facilitate coupling the sink assembly 600 to the wall mounting bracket 100. The openings 620 are typically disposed along the underside portion of the housing 612. However, in alternative embodiments, the openings 620 are disposed along other portions of the housing 612. The openings 620 are positioned on the housing 612 so that the openings 620 are aligned with both the channels 124 and the openings 328. The sink tray 616 extends from a second end 609 of the housing 612 and is sized and shaped to accommodate being coupled to the sink 650.

To couple the sink assembly 600 to the wall mounting bracket 100, the wall mounting bracket 100 is installed within the wall 480 as described with respect to FIG. 4. The wall 480 includes the blocking 488 and the sheetrock 494. Other components of the wall 480 are present but are not illustrated for convenience. The sliding nut 150 is positioned atop the top surface 117 such that the channels 124 and the openings 328 are aligned with one another. After the sheetrock 494 has been installed and disposed around the spacer 116 and the sliding nut 150 is positioned atop the top surface 117, the equipment mounting section 112 is inserted into the passageway 614 of the wall mounting section 610 such that the mounting platform's housing 612 is disposed around the equipment mounting section 112. The openings 620, channels 124, and openings 328 are all aligned with one another. A screw 624, or other attachment device, is inserted through the opening 620, channel 124, and opening 328 to couple the sink assembly 600 to the wall mounting bracket 100.

As seen in FIG. 6, the first end 608 of the housing 612 makes contact with the sheetrock 494. In exemplary embodiments where the sink assembly 600 includes one or more lighting elements (not shown), the lighting elements are powered using one or more electrical wires (not shown) that are routed from the interior of the wall 480, through the wall mounting bracket 100 via the aperture 125 (FIG. 2), and into the sink assembly 600. The lighting elements include, but are not limited to, LEDs, organic LEDs, halogen lamps, fluorescent lamps, compact fluorescent lamps, high intensity discharge lamps, incandescent lamps, or any other known light sources.

FIG. 7A-D are various views of a wall mounting bracket 700 in accordance with another exemplary embodiment of the present invention. Referring to FIGS. 7A-D, the exemplary wall mounting bracket 700 includes a post 710, a plate 130, a sliding nut 150, and a nut 170. The post 710, the plate 130, the sliding nut 150, and the nut 170 provide structural support for mounting equipment to a wall.

Each of the plate 130, the sliding nut 150, and the nut 170 have been previously described above in detail. The post 710, however, differs from the post 110 (FIGS. 1A-2). The post 710 includes an equipment mounting section 712, a nut mounting section 114, and a spacer 716 positioned therebetween. The nut mounting section 114 has been previously described above in detail. The shape of the equipment mounting section 712 and the spacer 716 is rectangular. Functionality of both the equipment mounting section 712 and the spacer 716 is similar to the functionality of the equipment mounting section 114 and the spacer 116. Further, the equipment mounting section 712 and the spacer 716 also include the different embodiments as described for the equipment mounting section 112 (FIGS. 1A-2) and the spacer 116 (FIGS. 1A-2), respectively.

Although each exemplary embodiment has been described in detail, it is to be construed that any features and modifications that are applicable to one embodiment are also applicable to the other embodiments. Although the invention has been described with reference to specific embodiments, these descriptions are not meant to be construed in a limiting sense. Various modifications of the disclosed embodiments, as well as alternative embodiments of the invention will become apparent to persons of ordinary skill in the art upon reference to the description of the exemplary embodiments. It should be appreciated by those of ordinary skill in the art that the conception and the specific embodiments disclosed may be readily utilized as a basis for modifying or designing other structures or methods for carrying out the same purposes of the invention. It should also be realized by those of ordinary skill in the art that such equivalent constructions do not depart from the spirit and scope of the invention as set forth in the appended claims. It is therefore, contemplated that the claims will cover any such modifications or embodiments that fall within the scope of the invention.

What is claimed is:

1. A wall mounting bracket for mounting a piece of equipment to a wall comprising:
    a plate comprising a passageway extending therethrough;
    a post comprising:
        an equipment mounting section comprising:
            a first end;
            a second end, and
            a top surface disposed between the first end and the second end;
        a spacer positioned between and adjacent to each of the plate and the first end of the equipment mounting section; and
        a nut mounting section extending horizontally from the spacer in a direction substantially opposite the direction of extension for the equipment mounting section, the nut mounting section being insertable through the passageway of the plate; and
    a sliding nut comprising a bottom surface positionable adjacent the top surface of the equipment mounting section,
    wherein at least a portion of the post extends horizontally out from the surface of the plate.

2. The wall mounting bracket of claim 1, wherein the top surface comprises a plurality of ridges extending orthogonal to a longitudinal axis of the equipment mounting section.

3. The wall mounting bracket of claim 1, wherein the sliding nut comprises a plurality of mating ridges, the mating ridges configured to engage one or more of the ridges of the top surface.

4. The wall mounting bracket of claim 1, wherein the second end of the equipment mounting section extends vertically above the top surface.

5. The wall mounting bracket of claim 1, wherein the equipment mounting section comprises at least one channel formed therein, the channel extending from the top surface through the equipment mounting section.

6. The wall mounting bracket of claim 5, wherein the sliding nut comprises at least one opening, the opening extending from the bottom surface of the sliding nut towards the top surface of the sliding nut, each opening being aligned with a corresponding channel.

7. The wall mounting bracket of claim 6, wherein the opening extends from the bottom surface of the sliding nut through the top surface of the sliding nut.

8. The wall mounting bracket of claim 1, wherein the post further comprises an aperture formed through at least the first end and the spacer.

9. The wall mounting bracket of claim 1, further comprising a nut removably coupled to the nut mounting section.

10. The wall mounting bracket of claim 9, wherein the nut comprises an aperture having a diameter less than or equal to the diameter of the passageway, wherein the diameter of the nut is equal to or greater than the diameter of the passageway, and wherein the diameter of the spacer is equal to or greater than the diameter of the passageway.

11. The wall mounting bracket of claim 1, wherein the equipment mounting section further comprises:
    a first section;
    a second section; and
    a transitional area that connects the first section and the second section;
    wherein the first section is positioned adjacent to the spacer and extends outwardly therefrom; and
    wherein the second section has a reducing perimeter as the second section extends further outward from the transitional area.

12. A wall mounting system, comprising:
    a wall mounting bracket comprising:
        a plate comprising a passageway extending therethrough;
        a post comprising:
            an equipment mounting section comprising:
                a first end;
                a second end; and
                a top surface disposed between the first end and the second end;
            a spacer positioned between and adjacent to the plate and the first end of the equipment mounting section; and
            a nut mounting section extending horizontally from the spacer in a direction substantially opposite the equipment mounting section, the nut mounting section being insertable through the passageway of the plate; and
        a sliding nut comprising a bottom surface adjustably positioned along the top surface of the equipment mounting section; and
    a piece of equipment comprising a wall mounting section, the wall mounting section configured to receive the equipment mounting section and the sliding nut,
    wherein at least a portion of the post extends orthogonally out from the surface of the plate; and
    wherein upon coupling the wall mounting section to the equipment mounting section and the sliding nut, the wall mounting section substantially surrounds the post.

13. The wall mounting system of claim 12, wherein the top surface comprises a first longitudinal side and a second longitudinal side opposite the first longitudinal side, each of first longitudinal side and the second longitudinal side comprising a plurality of ridges disposed orthogonally to the longitudinal axis of the equipment mounting section.

14. The wall mounting system of claim 12, wherein the sliding nut comprises a plurality of mating ridges, the mating ridges configured to engage one or more of the ridges of the top surface.

15. The wall mounting system of claim 12, wherein the second end of the equipment mounting section extends vertically above the top surface forming a lip with the top surface.

16. The wall mounting system of claim 12, wherein the equipment mounting section comprises at least one channel formed therein, each channel extending from the top surface and through the equipment mounting section.

17. The wall mounting system of claim 16, wherein the sliding nut comprises one or more openings, the openings extending from the bottom surface of the sliding nut towards the top surface of the sliding nut.

18. The wall mounting system of claim 17, wherein the wall mounting section comprises at least one opening, wherein at least one of the openings of the sliding nut, at least one of the openings of the wall mounting section, and at least one of the channels of the equipment mounting section are configured to align with one another.

19. The wall mounting system of claim 12, further comprising a nut comprising a channel extending therethrough, the nut mounting section being insertable through the channel of the nut and through the passageway of the plate, wherein the nut is removably coupleable to the nut mounting section.

20. The wall mounting system of claim 19, wherein the diameter of the nut is greater than or equal to the diameter of the passageway and wherein the diameter of the spacer is equal to or greater than the diameter of the passageway.

* * * * *